(12) United States Patent
Choi et al.

(10) Patent No.: US 9,032,138 B2
(45) Date of Patent: May 12, 2015

(54) STORAGE DEVICE BASED ON A FLASH MEMORY AND USER DEVICE INCLUDING THE SAME

(71) Applicant: Samsung Electronics Co., Ltd., Suwon-si (KR)

(72) Inventors: Hyun Jin Choi, Suwon-si (KR); Sang-Jin Oh, Suwon-si (KR); Dawoon Jung, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 13/682,964

(22) Filed: Nov. 21, 2012

(65) Prior Publication Data

US 2013/0132650 A1    May 23, 2013

(30) Foreign Application Priority Data

Nov. 23, 2011    (KR) .................... 10-2011-0123142

(51) Int. Cl.
*G06F 12/02*    (2006.01)
*G06F 3/06*    (2006.01)

(52) U.S. Cl.
CPC ............ *G06F 12/02* (2013.01); *G06F 12/0246* (2013.01); *G06F 3/0608* (2013.01); *G06F 3/0652* (2013.01); *G06F 3/0679* (2013.01); *G06F 2212/7209* (2013.01)

(58) Field of Classification Search
CPC .............. G06F 12/0246; G06F 3/0679; G06F 2212/2022; G06F 3/0688; G06F 2212/222; G06F 2212/7205
USPC .......................................................... 711/103
See application file for complete search history.

(56) References Cited

U.S. PATENT DOCUMENTS

2011/0145306 A1    6/2011    Boyd et al.
2011/0271037 A1*    11/2011    Oh et al. ....................... 711/103

FOREIGN PATENT DOCUMENTS

| JP | 2006-155461 | 6/2006 |
| JP | 2011-090496 | 6/2011 |
| JP | 2011-128998 | 6/2011 |
| KR | 10-20100121389 A | 11/2010 |

* cited by examiner

*Primary Examiner* — Jasmine Song
(74) *Attorney, Agent, or Firm* — Myers Bigel Sibley & Sajovec, PA

(57) ABSTRACT

Disclosed is a storage device which includes a flash memory storing data; and a controller controlling the flash memory and performing an invalidation operation in response to a trim command of a host, wherein the controller configures a trim sector bitmap using trim information provided from the host at the invalidation operation and manage the trim sector bitmap by a region unit.

18 Claims, 16 Drawing Sheets

|  | LBA Region(M-1) | LBA Region(M) | LBA Region(M+1) |
|---|---|---|---|
| <Local Memory> | | | |
| TRIM Sector Bitmap | 000000 ··· 000000(All '0') | 010110011 ··· 0101010001 | 111111 ··· 111111(All '1') |
| <Flash Memory> | | | |
| TRIM Sector Bitmap | 000000 ··· 000000(All '0') | 010110011 ··· 0101010001 | 111111 ··· 111111(All '1') |

STORAGE DEVICE BASED ON A FLASH MEMORY AND USER DEVICE INCLUDING THE SAME

REFERENCE TO PRIORITY APPLICATION

This application claims the benefits, under 35 U.S.C §119, of Korean Patent Application No. 10-2011-0123142, filed Nov. 23, 2011, the entirety of which is hereby incorporated by reference herein.

FIELD

This invention relates to flash memory-based storage devices and user devices including the same.

BACKGROUND

A user device may include both hosts such as a personal computer, a digital camera, a camcorder, a cellular phone, an MP3 player, a PMP, a PDA, and the like and storage devices such as a memory card, an USB memory, a Solid State Drive (SSD), a Hard Disk Drive (HDD), and the like. For the user device, a storage device may be included within a host. The storage device may include volatile memories such as a DRAM, a SRAM, and the like and nonvolatile memories such as an EEPROM, a FRAM, a PRAM, an MRAM, a flash memory, and the like.

In case that any file of a host is deleted, a file system may manage the file to be a deleted file. That a file is deleted may mean that metadata of the deleted file as file system management data is changed. Although a file is deleted at a host level, that is, although metadata of a deleted file is changed by a file system, a storage device may not judge whether it is a deleted file.

For this reason, a merge operation or a garbage collection operation may be performed on invalid files within the storage device. This operation may make the performance of the storage device lower. Further, since invalid files are stored like valid data, a valid storage space of the storage device may be reduced.

SUMMARY

Example embodiments of the inventive concept provide a storage device which comprises a flash memory storing data; and a controller controlling the flash memory and performing an invalidation operation in response to a trim command of a host, wherein the controller configures a trim sector bitmap using trim information provided from the host at the invalidation operation and manage the trim sector bitmap by a region unit.

In example embodiments, the controller includes an LBA region table for managing the trim sector bitmap by an LBA region unit having a predetermined size.

In example embodiments, the trim sector bitmap and the LBA region table are driven on a local memory.

In example embodiments, the LBA region table stores information on a region not receiving the trim information and a region all receiving the trim information.

In example embodiments, the LBA region table stores an address of the local memory, at which the trim information is being stored, and the number of data bits of the trim sector bitmap at which the trim information is stored.

In example embodiments, the controller does not assign the local memory for the trim sector bitmap separately, based on the LBA region table at an invalidation operation.

In example embodiments, the controller does not assign the local memory for the trim sector bitmap in case of a region not receiving the trim information or a region all receiving the trim information.

Example embodiments of the inventive concept also provide a user device which comprises a host providing a trim command; and a storage device performing an invalidation operation according to the trim command, wherein the storage device configures a trim sector bitmap using trim information provided from the host and manage the trim sector bitmap by a region unit.

In example embodiments, the storage device comprises a flash memory storing data; and a controller controlling the flash memory and dividing the trim sector bitmap by a region unit to perform a logging operation.

In example embodiments, the controller includes an LBA region table for managing the trim sector bitmap by an LBA region unit having a predetermined size.

In example embodiments, the controller includes a local memory, the trim sector bitmap and the LBA region table are driven on a local memory, and the LBA region table stores information on a region not receiving the trim information and a region all receiving the trim information.

In example embodiments, the controller does not assign the local memory for the trim sector bitmap in case of a region not receiving the trim information or a region all receiving the trim information.

In example embodiments, the controller further comprises a memory for driving a trim region bitmap that stores information on the LBA region table, and an operating speed of the memory is higher than that of the local memory.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
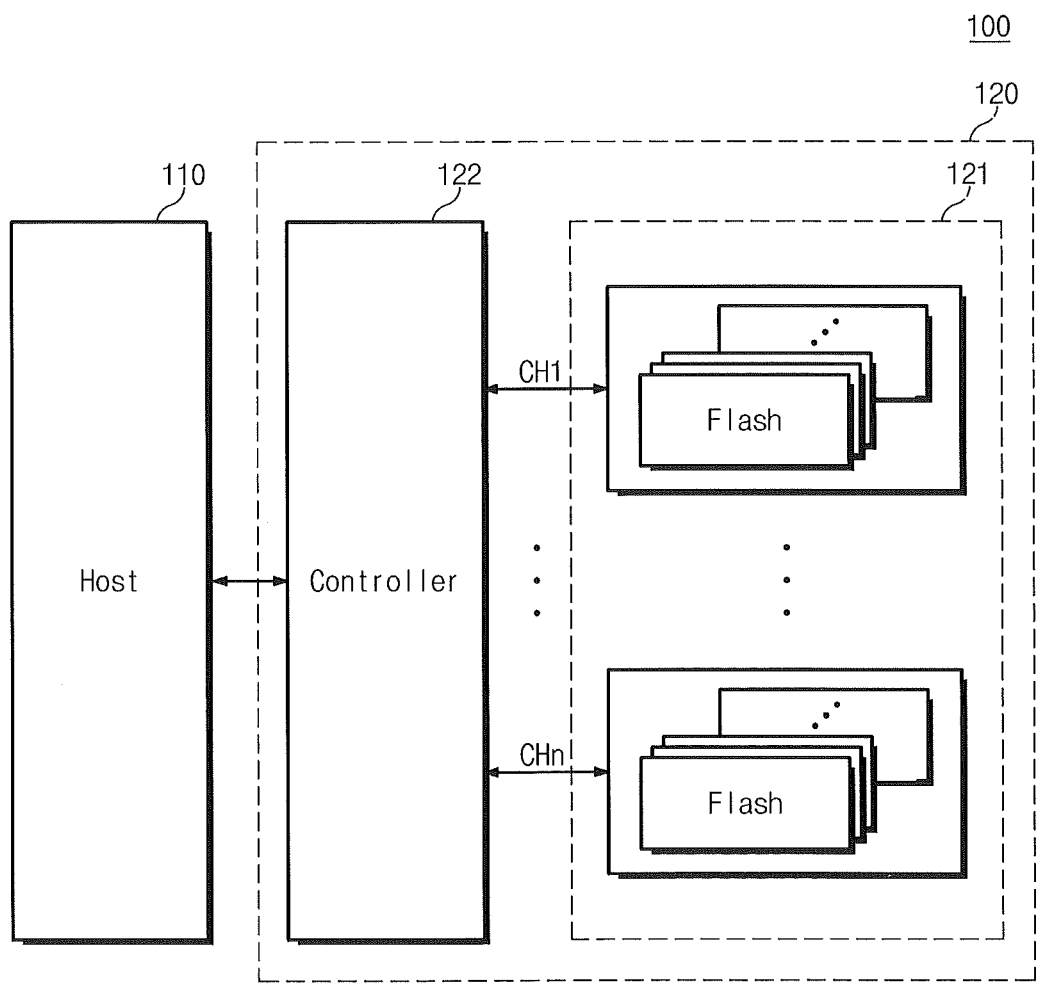
FIG. 1 is a block diagram schematically illustrating a user device according to an embodiment of the inventive concept.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A user device may include a host and a storage device. The user device may include a processor, a main memory, and a flash memory as hardware elements. Herein, the processor or the main memory can be included within the host, and the flash memory can be included within the storage device. Further, the user device may include user application, O/S, file system, Flash Translation Layer (FTL), and the like as software elements.

FIG. 1 is a block diagram schematically illustrating a user device according to an embodiment of the inventive concept. A user device 100 in FIG. 1 may perform an invalidating operation using a logging manner. Referring to FIG. 1, the user device 100 may include a host 110 and a storage device 120.

The host 110 may control the storage device 120. The host 110 may include hand-held electronic devices such as a computer, a PDA, a PMP, an MP3 player, a camera, a camcorder, a mobile phone, and the like. The host 110 may notify invalidation (or, deletion) of files to the storage device as occasion demands. This may be accomplished by sending a specific command to the storage device 120 from the host 110. The specific command may be referred to as a trim command. The trim command may include information (e.g., address information) for designating a region to be deleted.

Metadata on a file to be deleted may be processed by a file system (not shown) of the host 110. For fast processing, the file system may not delete the contents of the file, but may change the metadata. In case the metadata of a deleted file is changed, the contents of the file deleted at a file system level may be processed as invalid data, while it may be retained as valid data at a storage device level. For this reason, the storage device 120 may recognize a memory block including data of a deleted file as a valid block. Thus, the storage device may perform unnecessary operations on the deleted file data such as a merge operation, a garbage collection operation, and the like. To prevent such unnecessary operations, the host 110 may provide the storage device 120 with the trim command such that data of the deleted file is substantially invalidated.

Continuing to refer to FIG. 1, the storage device 120 may include a storage medium 121 that retains stored data even at power-off. The storage device 120 may be a Solid State Drive (SSD) or a memory card, for example. However, the storage device 120 is not limited thereto. The storage medium 121 may be formed of a plurality of flash memories. The storage medium 121 can be formed of a nonvolatile memory device (e.g., PRAM, FRAM, MRAM, etc.) different from the flash memory. Each of the nonvolatile memories constituting the storage medium 121 may store one bit of data per cell or two or more bits of data per cell. Each of the nonvolatile memories constituting the storage medium 121 can be configured to have a three-dimensional memory cell array. A controller 122 may control the storage medium 121 in response to a request from the host 110. The controller 122 may be connected with the storage medium 121 via a plurality of channels CH1 through CHn. Each channel may be connected with a plurality of flash memories. The controller 122 may include hardware elements such as a corresponding CPU, a memory, and the like and a hardware/software element (not shown) for performing an invalidation operation in response to the trim command of the host 110.

When the trim command is provided from the host 110, the controller 122 may record a location of a region or, files to be deleted, and may notify that execution of the requested trim command is completed, to the host 110. In other words, the storage device 120 may not invalidate a region of files to be deleted, but record only a location of a region of invalid files. Thus, it is possible to rapidly respond to a request of the host 110. The speedy response of the storage device 120 may enable the performance of the user device 100 to be improved.

Figure 2:
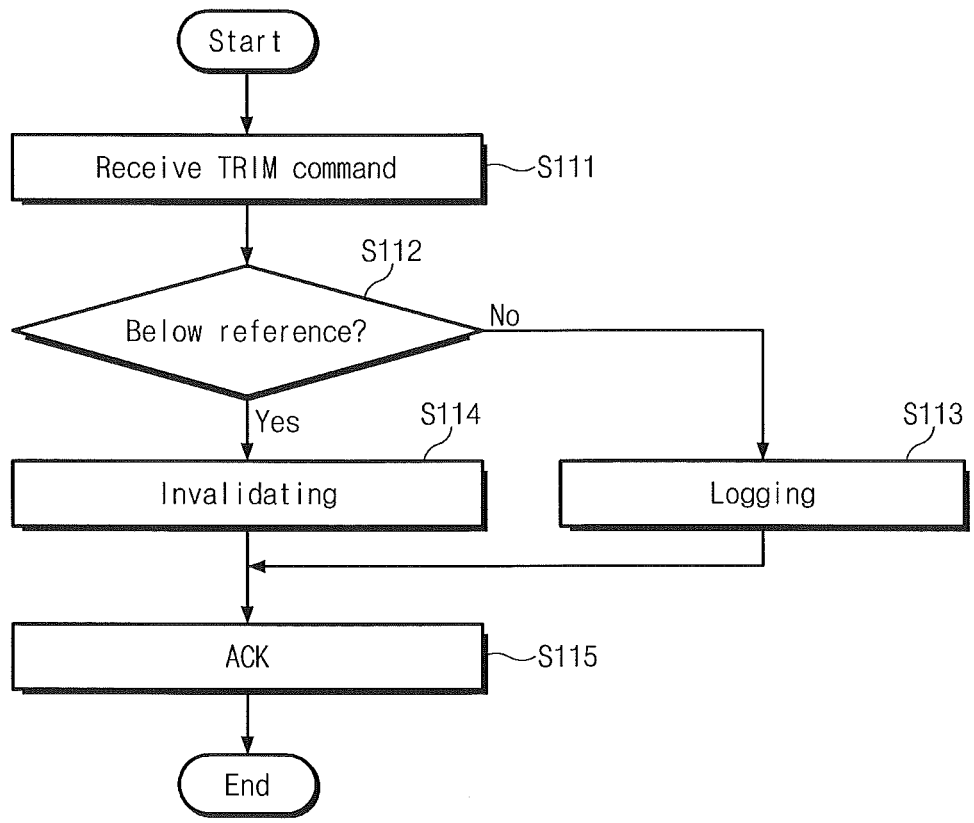
FIG. 2 is a flowchart for describing an operation of a user device illustrated in FIG. 1.

FIG. 2 is a flowchart for describing an operation of a user device illustrated in FIG. 1. A host 110 may provide a storage device 120 with a trim command as occasion demands. The trim command may be used to delete files, having invalid contents, from among files stored in the storage device 120. An invalidation operation of a user device 100 will be described with reference to FIGS. 1 and 2. In operation S111, the storage device 120 may receive the trim command from the host 110. The trim command may include information (hereinafter, referred to as 'trim information') informing a region of files having invalid contents. Address information on a region of a file to be deleted can be included in the trim information. In operation S112, a controller 122 of the storage device 120 may judge whether a capacity of a region to be deleted exceeds a reference capacity, according to the trim command. The reference capacity can be set to be varied in hardware or software. For example, the reference capacity may be changed via updating firmware of the storage device 120. Further, the reference capacity can be set to be varied by the host 110. In this case, the reference capacity can be set by storing a specific value, indicating a new reference capacity, in a register (used to store the reference capacity) of a host interface during a cognitive process between the host 110 and the storage device 120. A region to be deleted may indicate a logical region, and may be translated into a physical region of the storage medium 121 by firmware (e.g., FTL).

A capacity of a region to be deleted according to the trim command can be limited by the storage device 120. In this case, the maximum capacity of a region to be deleted via the trim command may be recorded in the storage device 120, and the host 110 may generate the trim command using information indicating the maximum capacity of a region to be deleted that is recorded in the storage device 120.

Continuing to refer to FIG. 2, if the capacity of a region to be deleted exceeds the reference capacity, the method proceeds to operation S113, in which the controller 122 may record a location of the region to be deleted. This may be referred to as logging. After the location of the region to be deleted is recorded, the method proceeds to operation S115, in which the controller 122 may notify that execution of the trim command is completed, to the host 110. Afterwards, the method may be ended.

Although not illustrated in FIG. 1, the controller 122 may include a memory in which trim information indicating a location of a region to be deleted is stored. The trim information associated with the region to be deleted May be recoded using a bitmap structure. However, a manner of recording the trim information is not limited thereto. For example, address information of a region to be deleted can be recorded. A history in which a location of a region to be deleted is recorded may be stored in the storage medium 121 periodically or as occasion demands. The history thus stored may be loaded onto a memory (not shown) of the controller 122 at power-on. The history can be managed using a buffer memory (not shown) outside the controller 122. At an idle time, the controller 122 may invalidate the region to be deleted using the history stored in the buffer memory or the storage medium 121.

Herein, invalidation may mean that data stored in a region to be deleted is processed as invalid data. This invalidation may be accomplished by managing a mapping table in which mapping between physical blocks and logical blocks is recorded. For example, the invalidation may be accomplished by mapping out mapping information on a region to be deleted from the mapping table or by marking it at the mapping table. The mapping table may be managed by a Flash Translation Layer (FTL).

Continuing to refer to FIG. 2, in case that the capacity of a region to be deleted does not exceed the reference capacity, an invalidation operation may be executed. In operation S114, the controller 122 may process data recorded at the region to be deleted as invalid data without recording of a location of the region to be deleted. As described above, the invalidation may be accomplished by mapping out mapping information on a region to be deleted from the mapping table or by marking it at the mapping table. After data recorded at the region to be deleted is processed to be invalid data, in operation S115, the controller 122 may notify that execution of the trim command is completed, to the host 110. Afterwards, the method may be ended.

Returning to FIG. 1, the storage device 120 may process a trim command rapidly within a given time (e.g., a time taken to process a command from the host 100) regardless of a capacity of a region to be deleted, via a logging manner. Further, it is possible to prevent program and erase operations on an invalidated region from be performed unnecessarily.

Figure 3:
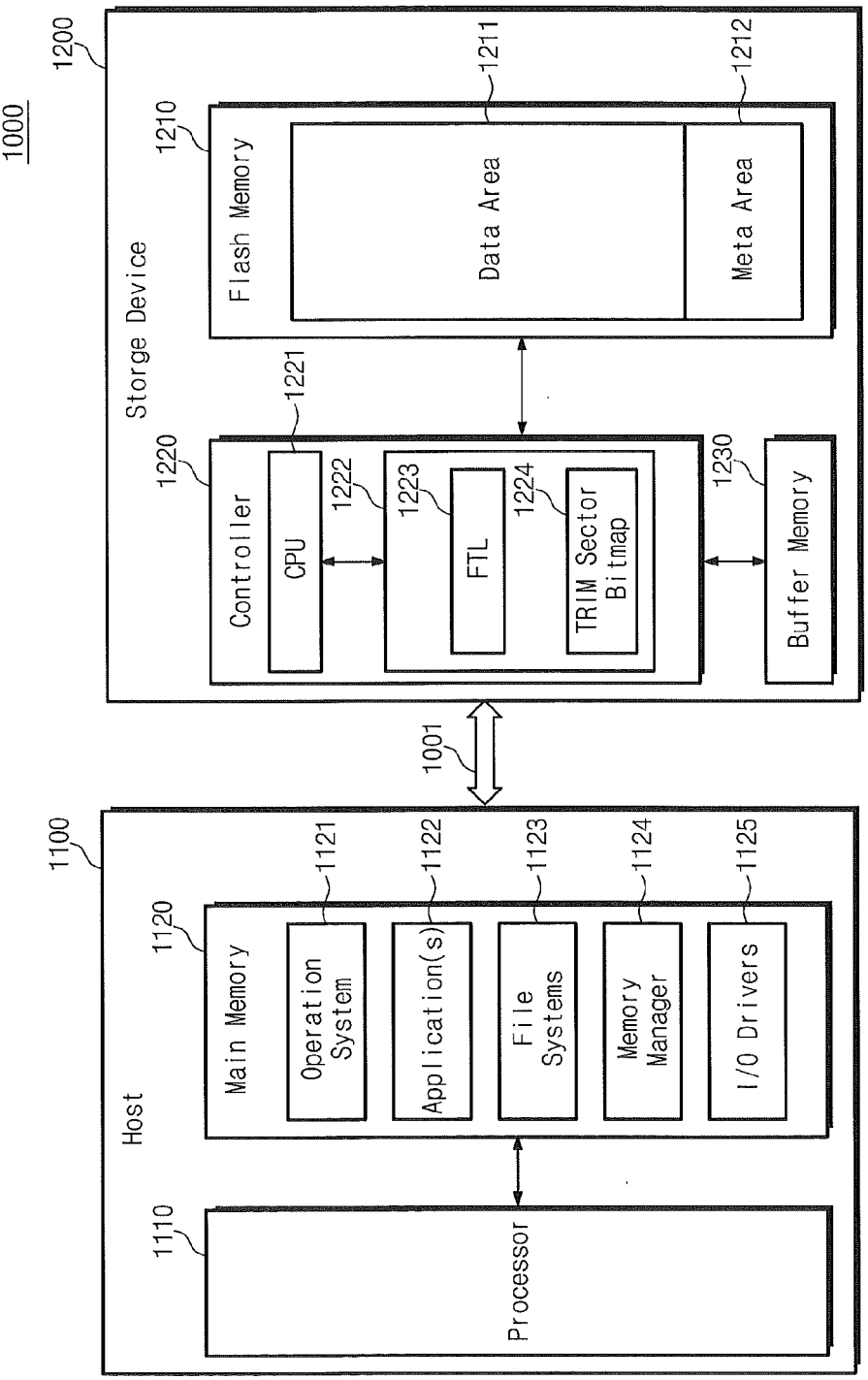
FIG. 3 is a block diagram schematically illustrating a user device that performs an invalidation operation using a trim command.

FIG. 3 is a block diagram schematically illustrating a user device that performs an invalidation operation using a trim command. A user device 1000 of FIG. 3 may perform an invalidation operation using an above-described logging manner. Further, the user device 1000 may manage trim information using a trim sector bitmap structure.

Referring to FIG. 3, the user device 1000 may include a host 1100 and a storage device 1200. The host 1100 and the interface 1200 may be connected via an interface 1001. The interface 1001 may include a standardized interface such as ATA, SATA, PATA, USB, SCSI, ESDI, IEEE 1394, IDE, and/or a card interface. The host 1100 may include a processor 1110 and a main memory 1120. The processor 1110 and the main memory 1120 may be connected via an address/data bus. The host 1100 may be a Personal Digital Assistance (PDA), a computer, a digital audio player, a digital camera, or a mobile phone. The main memory 1120 may be a nonvolatile or volatile memory such as a cache, a ROM, a PROM, an EPROM, an EEPROM, a flash memory, an SRAM, and a DRAM.

Referring to FIG. 3, the main memory 1120 may drive a plurality of software or firmware. In example embodiments, the main memory 1120 may include an operating system 1121, an application 1122, a file system 1123, a memory manager 1124, and an input/output driver 1125. The operating system 1121 may control a software and/or hardware resource of the host 1100, and may control program execution by the processor 1110. The application 1122 may indicate various application programs executed at the host 1100.

The file system 1123 may organize the case that a file or data is stored in a storage region such as the memory 1120 or the storage device 1200. The file system 1123 may provide the storage device 1200 with trim information according to a trim command. The file system 1123 may be used according to the operating system 1121 executed at the host 1100. The file system 1123 can be included within the operating system 1121.

The memory manager 1124 may control a memory access operation executed at the main memory 1120 and/or a memory access operation that is executed at an external device such as the storage device 1200. The input/output driver 1125 may perform an information transfer among the host 1100 and another device such as the storage device 1200, a computer system, or a network (e.g., an internet).

Continuing to refer to FIG. 3, the storage device 1200 may be a data storage device that is based on a flash memory 1210. In example embodiments, the storage device 1200 may include a flash memory 1210, a controller 1220, and a buffer memory 1230. The storage device 1200 may be a memory card device, an SSD device, an ATA bus device, an SATA bus device, a multimedia card device, an SD device, a memory stick device, a hybrid drive device, or an USB flash device.

The flash memory 1210 may be connected with the controller 1220 via an address/data bus. The flash memory 1210 may perform an erase operation by the memory block and a read/write operation by the page. The flash memory 1210 may perform an erase operation before a write operation. Although data stored in the flash memory 1210 is invalidated at a host level, it may be retained due to a characteristic of the flash memory 1210 that does not support an overwrite operation. This may be because mapping information is managed by the FTL and a physical region of the flash memory 1210 is not managed substantially.

Continuing to refer to FIG. 3, the flash memory 1210 may be divided into a data area 1211 and a meta area 1212. User data or main data may be stored in the data area 1211, and metadata (e.g., mapping information managed by FTL) needed to drive the flash memory 1210 or the storage device 1200 other than the user data may be stored in the meta area 1212.

The controller 1220 may exchange data with the flash memory 1210 or the buffer memory 1230 via an address/data bus. The controller 1220 may include a CPU 1221 and a local memory 1222. The controller 1220 may record a location of a region to be deleted according to a trim command at the local memory 1222 or the buffer memory 1230. That is, whenever a trim command is input, the controller 1220 may perform a logging operation to record a location of a region to be deleted at a memory. An invalidation operation according to the logging operation may be executed at an idle time.

The CPU 1221 may be a commercially usable or customized processor. The local memory 1222 may include a cache, a ROM, a PROM, an EPROM, an EEPROM, a flash memory, an SRAM, and a DRAM. The local memory 1222 may drive a FTL 1223 and a trim sector bitmap 1224 according to the control of the CPU 1221. The FTL 1223 may be used to efficiently use the flash memory 1210. The FTL 1223 may translate logical addresses provided from the host 1100 into physical addresses for the flash memory 1210. The FTL 1223 may manage address translation using a mapping table.

An allowable erase count (e.g., about 100,000) of the flash memory 1210 may be predetermined. The flash memory 1210 may scatter an erase operation over all memory blocks to prevent a specific memory block from being worn out rapidly compared with other memory blocks. This may be referred to as wear-leveling. The FTL 1223 may be used to manage wear-leveling of the flash memory 1210.

The trim sector bitmap 1224 may be managed by the FTL 1223. A location of a region to be deleted according to a trim command or trim information may be recorded at the trim sector bitmap 1224. For example, the storage device 1200 may configure a bitmap of a sector unit using trim information provided from the host 1100, and the bitmap may be retained or managed on the local memory 1222. The buffer memory 1230 may be used to temporarily store data to be stored in the flash memory 1210 or data read out from the flash memory 1210. The buffer memory 1230 can be used to store the above-described trim sector bitmap. The buffer memory 1230 may be formed of a volatile memory or a nonvolatile memory.

Figure 4:
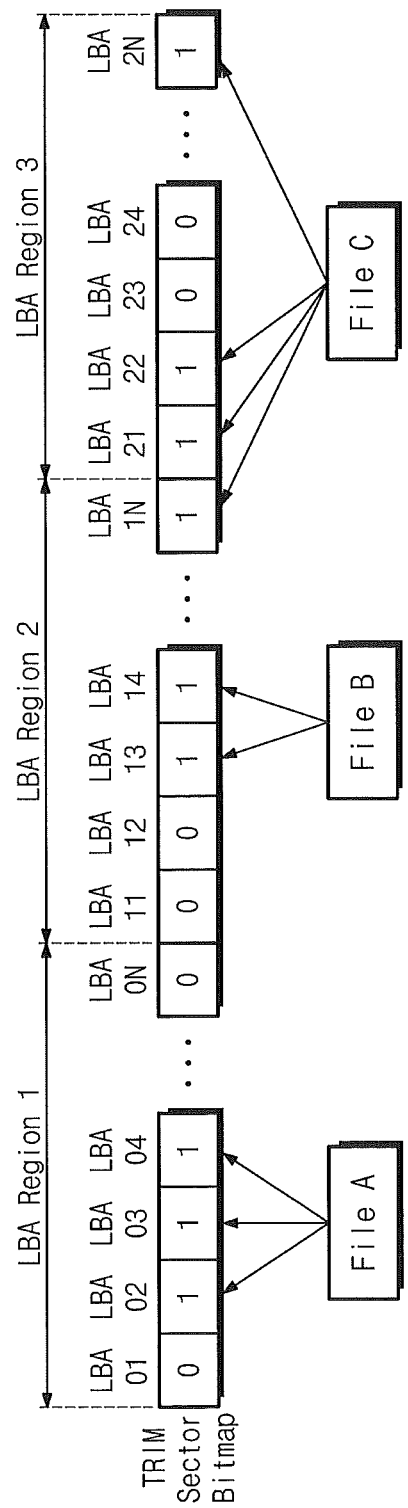
FIG. 4 is a diagram for describing a trim sector bitmap illustrated in FIG. 3.

FIG. 4 is a diagram for describing a trim sector bitmap illustrated in FIG. 3. A storage device 1200 may perform a logging operation, in which a location of a region to be deleted is recorded at a trim sector bitmap 1224, in response to an input of a trim command from a host 1100, and may perform an invalidation operation during an idle time. In FIG. 4, there is exemplarily illustrated the case that a location of a region to be deleted or trim information is recorded at a trim sector bitmap. In case that a trim command on files A, B, and C is received from the host 1100, the storage device 1200 may record trim information at a bitmap of logical block addresses LBA on the file A, B, and C. In FIG. 4, trim information on the file A may be recorded at a bitmap of LBA_02, LBA_03, and LBA_04. Trim information on the file B may be recorded at a bitmap of LBA_13 and LBA_14, and trim information on the file C may be recorded at a bitmap of LBA_1N, LBA_21, LBA_22, and LBA_2N. In FIG. 4, trim inform may be marked by data '1'.

Continuing to refer to FIG. 4, a trim sector bitmap may be divided into LBA regions having a given size. For example, three LBA regions may be illustrated in FIG. 4. However, the number of LBA regions is not limited thereto. Each of the LBA regions may be formed of logical block address from 1 to N (N being a natural number). A first LBA region may be formed of LBA_01 through LBA_0N, a second LBA region may be formed of LBA_11 through LBA1N, and a third LBA region may be formed of LBA_21 through LBA2N. LBA_02, LBA_03, and LBA_04 corresponding to the file A may be included within the first LBA region, LBA_13 and LBA_14 corresponding to the file B may be included within the second LBA region, and LBA_1N, LBA_21, LBA_22, and LBA_2N corresponding to the file C may be included within the second and third LBA regions.

As described above, trim information on one file may be included within one LBA region or two or more LBA regions. Further, trim information may not be recorded at any LBA region, or may be recorded at all bits of the bitmap. This will be more fully described with reference to FIG. 5.

Figure 5:
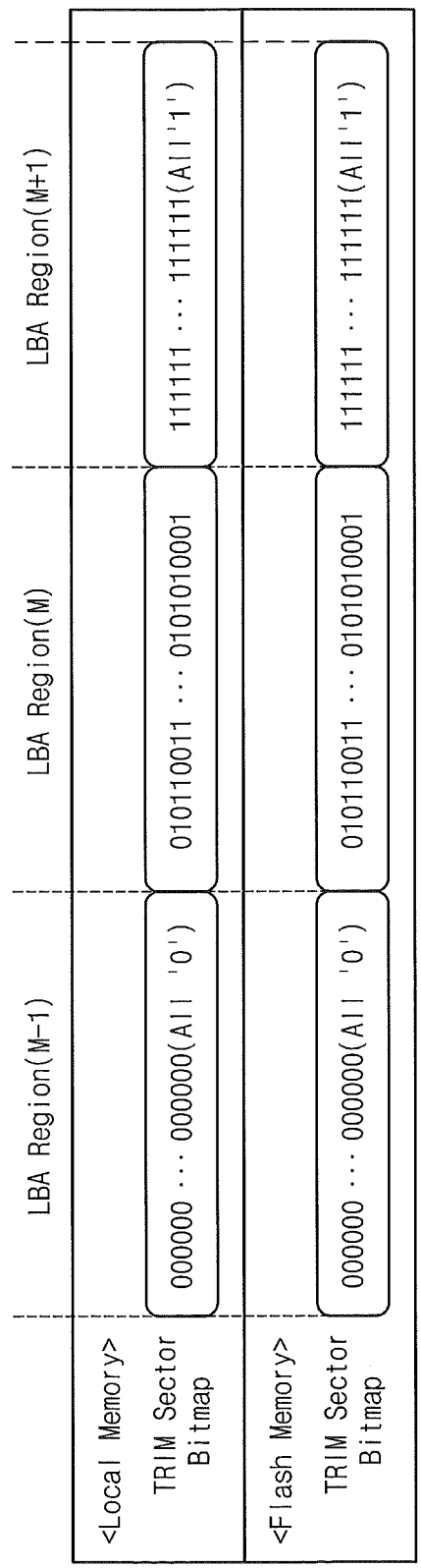
FIG. 5 is a diagram illustrating a trim sector bitmap in FIG. 3 according to another embodiment of the inventive concept.

FIG. 5 is a diagram illustrating a trim sector bitmap in FIG. 3 according to another embodiment of the inventive concept. Referring to FIG. 5, a trim sector bitmap 1224 may be driven on a local memory 1222, and may be stored in a meta region 1212 of a flash memory 1210 to retain data. The trim sector bitmap 1224 stored in the local memory 1222 may be stored in the meta area 1212 periodically during an operation of the storage device 1200 or at a specific time such as an idle time. Further, the trim sector bitmap 1224 stored in the meta region

1212 may be loaded onto the local memory 1222 at power-on of a user device 1000 or when needed.

Referring to FIG. 5, the trim sector bitmap 1224 may be divided into LBA regions each having a given size. Herein, the LBA region may not be divided always by a given size. The LBA regions may be divided to have different sizes as occasion demands. Trim information of '0' may be recorded at all bits of a (M−1)th LBA region. Bits of an Mth LBA region may be marked by trim information '1' or data '0'. Trim information of '1' may be recorded at all bits of a (M+1)th LBA region. Herein, trim information of '0' may indicate that trim command is not received from the host 1100. Trim information of '1' may indicate that trim command is received from the host 1100. In other words, trim command may not be received on any of the bits of the (M−1)th LBA region, and trim command may be received on all bits of the (M+1)th LBA region. Trim command may be received on some (marked by '1') of bits of the Mth LBA region, while it may not be received on the others (marked by '0') thereof.

A user device 1000 (refer to FIG. 3) according to an embodiment of the inventive concept may use a local memory 1224 or a buffer memory 1230 efficiently by dividing LBA regions according to whether trim information is received or not. A memory may be managed more efficiently by specifically managing the (M+1)th LBA region, in which trim information is received on all bits, and the (M−1)th LBA region in which trim information is not received on any bits (e.g., no bits). For example, the user device 1000 may manage trim information on a LBA region-by-region basis, so that a space of available memory is increased. Further, it is possible to use trim information more rapidly at reading or writing.

Figure 6:
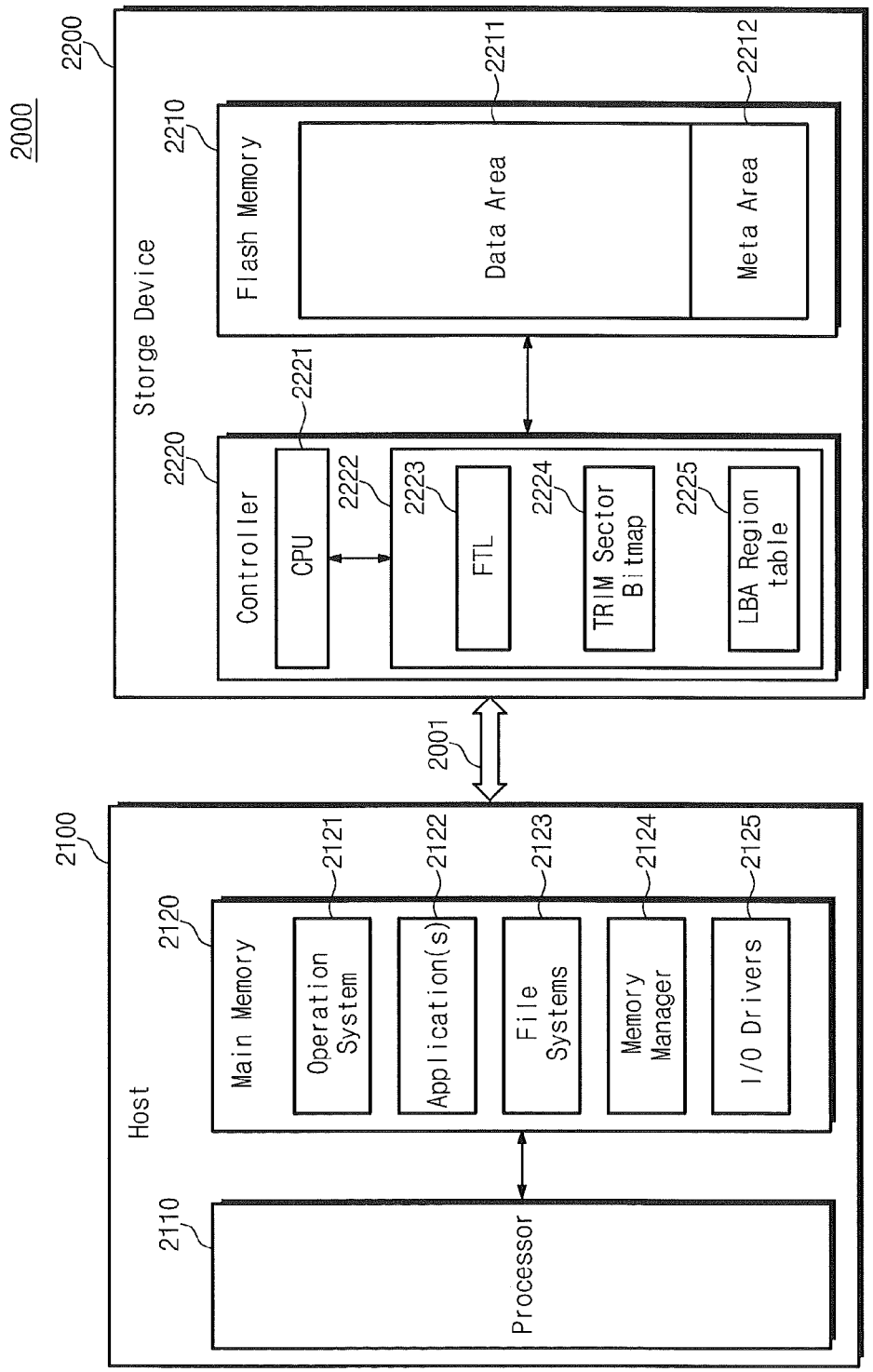
FIG. 6 is a block diagram schematically illustrating a user device, which performs an invalidation operation using a trim command, according to another embodiment of the inventive concept.

FIG. 6 is a block diagram schematically illustrating a user device, which performs an invalidation operation using a trim command, according to another embodiment of the inventive concept. Referring to FIG. 6, a user device 2000 may include a host 2100 and a storage device 2200. A host 2100 may include a processor 2110 and a main memory 2120. The main memory 2120 may include an operating system 2121, an application 2122, a file system 2123, a memory manager 2124, and an input/output driver 2125. The storage device 2200 may include a flash memory 2210 and a controller 2220. The flash memory 2210 may be divided into a data area 2211 and meta area 2212. User data may be stored in the data area 2211, and metadata such as trim information may be stored in the meta area 2212. The controller 2220 may include a CPU 2221 and a local memory 2222. The local memory 2222 may be one or more memories that are used to drive software or data for operating the storage device 2200. A FTL 2223, a trim sector bitmap 2224, and an LBA region table 2225 may be driven using the local memory 2222. The trim sector bitmap 2224 may be retained by the FTL 2223. Information on a region to be deleted according to a trim command may be recorded at the trim sector bitmap 2224. For example, the storage device 2200 may configure a bitmap of a sector unit using trim information provided from the host 2100, and may retain or manage it on the local memory 2222. The trim sector bitmap 2224 may be managed by an LBA region unit.

The LBA region table 2225 may have information on LBA regions. For above examples, the LBA region table 2225 may store information associated with a region not receiving any trim command and a region receiving all trim commands. Further, the LBA region table 2225 may store an address of a memory where trim information is stored or the number of bits of the trim sector bitmap 2224 where trim information is stored.

Figure 7:
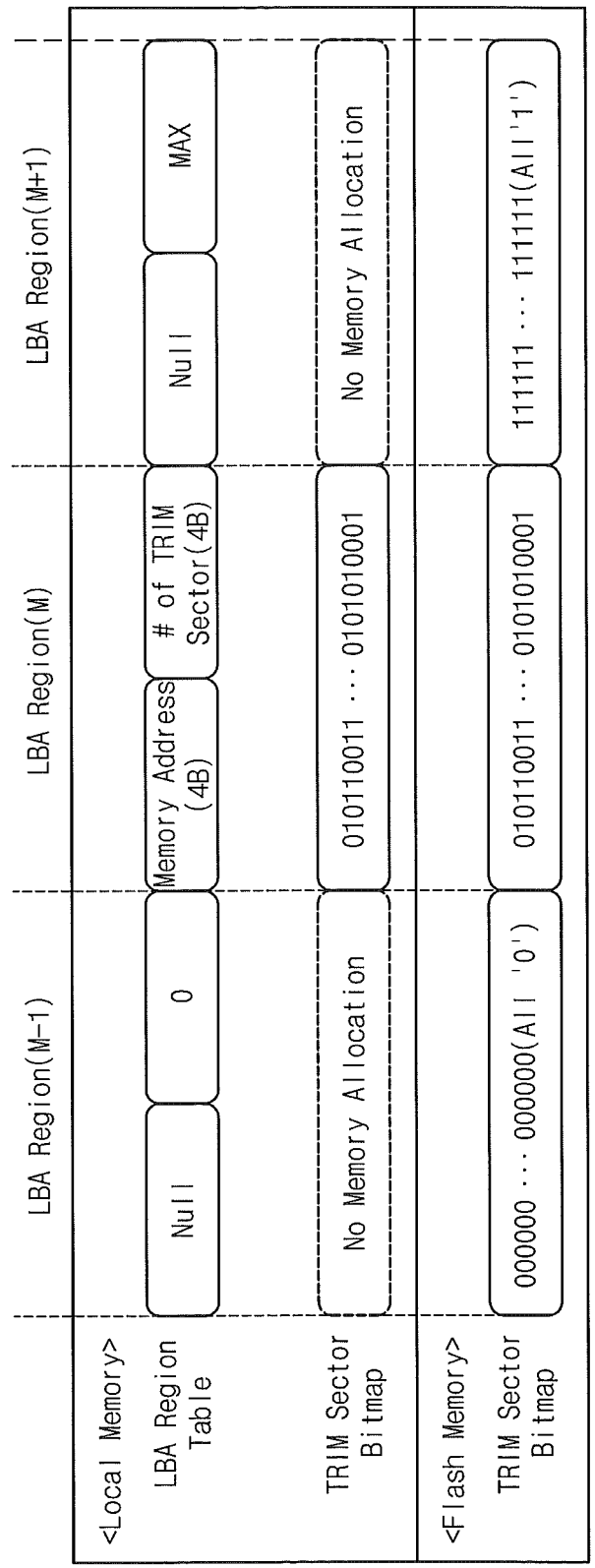
FIG. 7 is a diagram illustrating a trim sector bitmap and an LBA region table of a user device in FIG. 6.

FIG. 7 is a diagram illustrating a trim sector bitmap and an LBA region table of a user device in FIG. 6. In FIG. 7, there is illustrated a method for managing and logging trim information on a LBA region-by-region basis. Referring to FIG. 7, a trim sector bitmap 2224 (refer to FIG. 6) may be driven on a local memory 2222, and may be stored in a meta area 2212 of a flash memory 2210 to retain data. All bitmap data of a (M−1)th LBA region may be recorded to store data '0', and the local memory 2222 may not be assigned for a trim sector bitmap. All bitmap data of a (M+1)th LBA region may be recorded to store data '1', and the local memory 2222 may not be assigned for a trim sector bitmap. The local memory 2222 may be assigned only on an Mth LBA region. A part (marked by '1') of the Mth LBA region may be recorded to receive a trim command, and the remaining (marked by '0') thereof may be recorded not to receive a trim command.

An LBA region table 2225 (refer to FIG. 6) may indicate a memory address for storing a trim sector bitmap and the number of trim sectors (e.g., the number of bits marked by '1'). In FIG. 7, a 4-byte memory address and a trim sector number are exemplarily illustrated. In case of a (M−1)th LBA region all bitmap data of which is marked by '0', a memory address may be marked by 'Null', and the number of trim sectors may be marked by '0'. In case of a (M+1)th LBA region all bitmap data of which is marked by '1', a memory address may be marked by 'Null', and the number of trim sectors may be marked by 'MAX'.

A trim region table 2225 may store a memory address of a trim sector bitmap by an LBA region unit. Thus, a storage device 2200 can know whether any address is accessed to refer to trim information at reading or writing. In case that a memory address is Null, trim of a corresponding LBA may be confirmed based on whether all trim sector bits are '0' or 'MAX'. Trim information on each LBA region may be reflected to a mapping table of a flash translation layer 2223 under a given condition. If trim information of any LBA region is all reflected to a mapping table, the number of trim sectors may become '0', and a corresponding LBA region may become a region that does not receive trim information. That is, at the trim region table 2225, a memory address of a corresponding LBA region may be marked by 'Null'. It is possible to rapidly response to a command and to rapidly refer to a region to be deleted at reading or writing even under a memory limitation.

A logging method of a user device illustrated in FIG. 7 may include dividing an LBA region by a given size and classifying the LBA region into a region not receiving trim information and a region receiving trim information. Since trim information is reflected to a mapping table of the FTL 2223, an LBA region receiving trim information may be gradually changed into a region not receiving trim information. For example, as a time elapses, the (M+1)th LBA region may be changed into an Mth LBA region, and the Mth LBA region may be changed into the (M−1)th LBA region.

A user device 200 according to the inventive concept may be configured to divide an LBA region by a given size and to decide assignment of a local memory resource for a trim sector bitmap according to trim information within each LBA region. With the inventive concept, a memory may be efficiently used since a local memory 2222 is not assigned to an LBA region not receiving a trim command and an LBA region receiving all trim commands.

Figure 8:
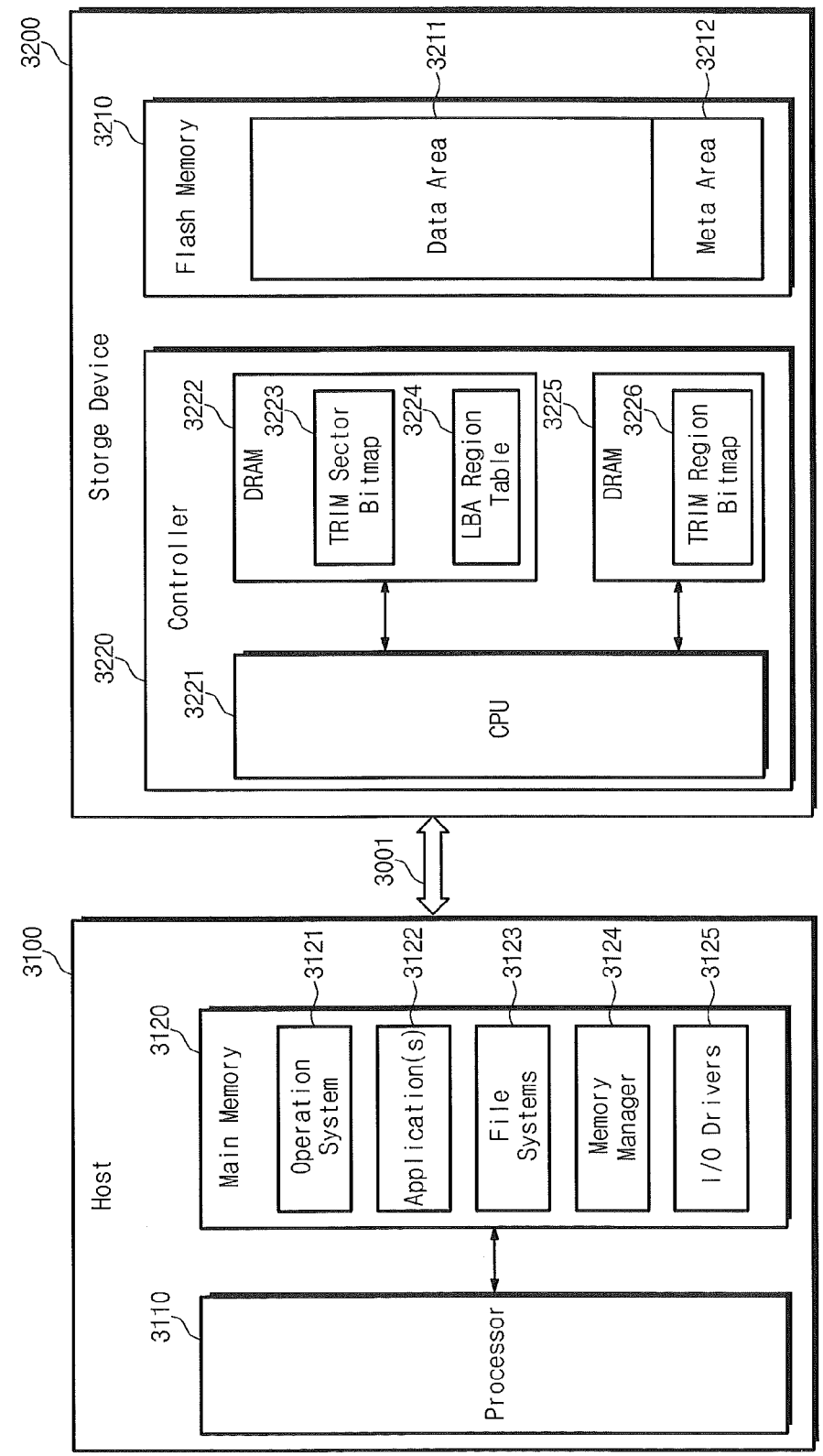
FIG. 8 is a block diagram schematically illustrating a user device, which performs an invalidation operation using a trim command, according to still another embodiment of the inventive concept.

FIG. 8 is a block diagram schematically illustrating a user device, which performs an invalidation operation using a trim command, according to still another embodiment of the inventive concept. Referring to FIG. 8, a user device 3000 may include a host 3100 and a storage device 3200. A host 3100 may include a processor 3110 and a main memory 3120. The main memory 3120 may include an operating system 3121, an application 3122, a file system 3123, a memory manager 3124, and an input/output driver 3125. The storage device 3200 may include a flash memory 3210 and a controller 3220. The flash memory 3210 may be divided into a data area 3211 and meta area 3212. User data may be stored in the data area 3211, and metadata such as trim information may be stored in the meta area 3212. The controller 3220 may include a CPU 3221 a DRAM 3222, and an SRAM 3225. The SRAM 3225 may operate in a high speed compared with the DRAM 3222. Since a high-speed memory (e.g., SRAM) and a low-speed memory (e.g., DRAM) are used separately, the user device 3000 in FIG. 8 may perform a trim operation more efficiently. A trim sector bitmap 3223 and an LBA region table 3224 may be driven using the DRAM 3222, and a trim region bitmap 3226 may be driven using the SRAM 3225.

The trim sector bitmap 3223, the LBA region table 3224, and the trim region bitmap 3226 may be maintained or managed by a flash translation layer (not shown). Information on a region to be deleted according to a trim command may be recorded at the trim sector bitmap 3223. For example, the storage device 3200 may configure a bitmap of a sector unit using trim information provided from the host 3100, and may retain or manage it on the DRAM 3222. The trim sector bitmap 3224 may be managed by an LBA region unit.

The LBA region table 3224 may have information on LBA regions. For above examples, the LBA region table 3224 may store an address of a memory where a trim sector bitmap is stored or the number of the trim sectors bitmap 2224. In case of an LBA region all bitmap data of which is '0', a memory address may be marked by 'Null', and the number of trim sectors may be marked by '0'. In case of an LBA region all bitmap data of which is '1', a memory address may be marked by 'Null', and the number of trim sectors may be marked by 'MAX'.

Information on the LBA region table 3224 of the DRAM 3222 may be stored in the trim region bitmap 3226 of the SRAM 3225. For example, a trim managing operation may be performed more efficiently by separately managing such a region that the LBA region table 3224 is marked by 'Null'. This will be more fully described with reference to FIG. 9.

Figure 9:
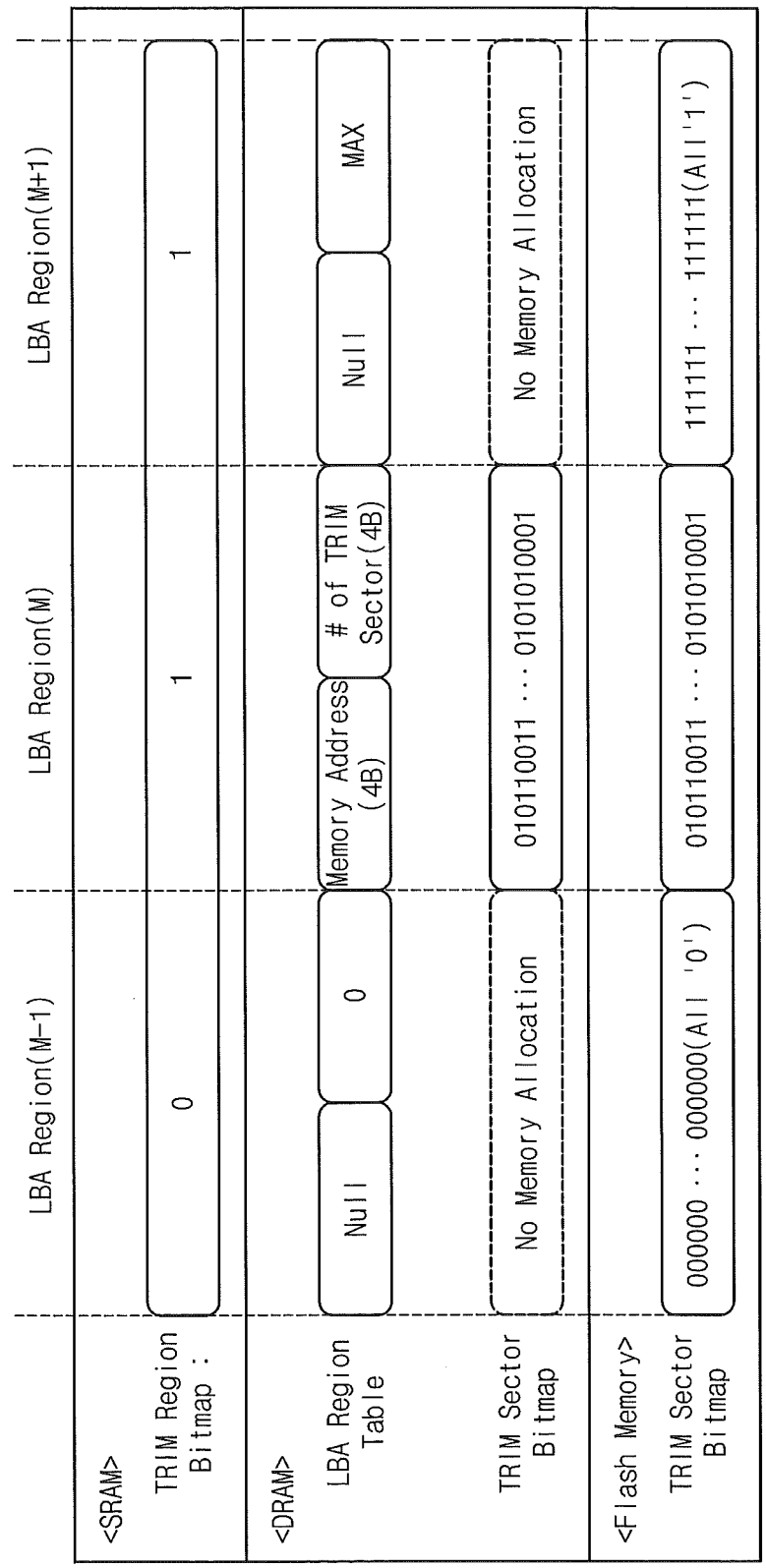
FIG. 9 is a diagram for describing a method of logging and managing trim information by an LBA region unit at a user device in FIG. 8.

FIG. 9 is a diagram for describing a method of logging and managing trim information by an LBA region unit at a user device in FIG. 8. In FIG. 9, a trim sector bitmap 3223 and an LBA region table 3224 driven on a DRAM 3222 and a trim region bitmap 3226 driven at an SRAM 3225 are exemplarily illustrated. Referring to FIG. 9, a trim sector bitmap 3223 may be driven using the DRAM 3222, and may be stored in a meta area 3212 of a flash memory 3210 to remain data. All LBA bit data of (M−1)th and (M+1)th LBA regions may be marked by '0' or '1', and the DRAM 3222 may not be separately assigned for a trim sector bitmap. A part (marked by '1') of an Mth LBA region may receive a trim command, and the remaining (marked by '0') thereof may not receive a trim command. An LBA region table 3224 may indicate a memory address, at which a trim sector bitmap is stored, and the number of trim sectors (e.g., the number of bits marked by '1'). In case of a (M−1)th LBA region all bitmap data of which is '0', a memory address may be marked by 'Null', and the number of trim sectors may be marked by '0'. In case of a (M+1)th LBA region all bitmap data of which is '1', a memory address may be marked by 'Null', and the number of trim sectors may be marked by 'MAX'. A trim region bitmap 3226 may have information on the case that bitmap data is all '0' and the case that at least one of '1' is included. In FIG. 9, '0' may be recorded on the (M+1)th LBA region in which bitmap data is all '1', and '1' may be recorded on an Mth LBA region or the (M+1)th LBA region in which at least one of '1' is included. In the event that '0' is recorded at the trim region bitmap 3226, it is unnecessary to read the trim sector bitmap 3223 or the LBA region table 3224. In this case, the storage device 3200 may read a mapping table of a flash translation layer (not shown) to send a response signal to a host 3100.

Returning to FIG. 8, the storage device 3200 may reduce an unnecessary operation of a flash memory 3210 using trim information provided from a file system 3123 of the host 3100. One trim command may include information on many regions to be deleted (e.g., many megabytes). In case of a conventional storage device, quite a long time may be taken until all regions are deleted. This may mean that a response time on a trim command becomes long. In case of the inventive concept, it is possible to reduce lowering of the performance or a response delay phenomenon on the trim command by logging trim information at an input of a trim command and invalidating a logged region at an idle time.

A conventional storage device may be efficient when a capacity of a local memory (DRAM or SRAM) is sufficient to manage all trim information. However, a user device 3000 according to the inventive concept may use the DRAM 3222 efficiently by classifying an LBA region into an LBA region not receiving trim information and an LBA region all receiving trim information. The inventive concept may be applied to the circumstance that all trim information is not logged since a memory resource (DRAM or SRAM) of a storage device 3200 is not sufficient to log all trim information. Further, the user device 3000 may reduce a read count of the DRAM 3222 by driving the trim region bitmap 3226 using the high speed SRAM 3225. The inventive concept may response to a trim command rapidly and may refer to trim information rapidly at the following write or read operation.

Figure 10:
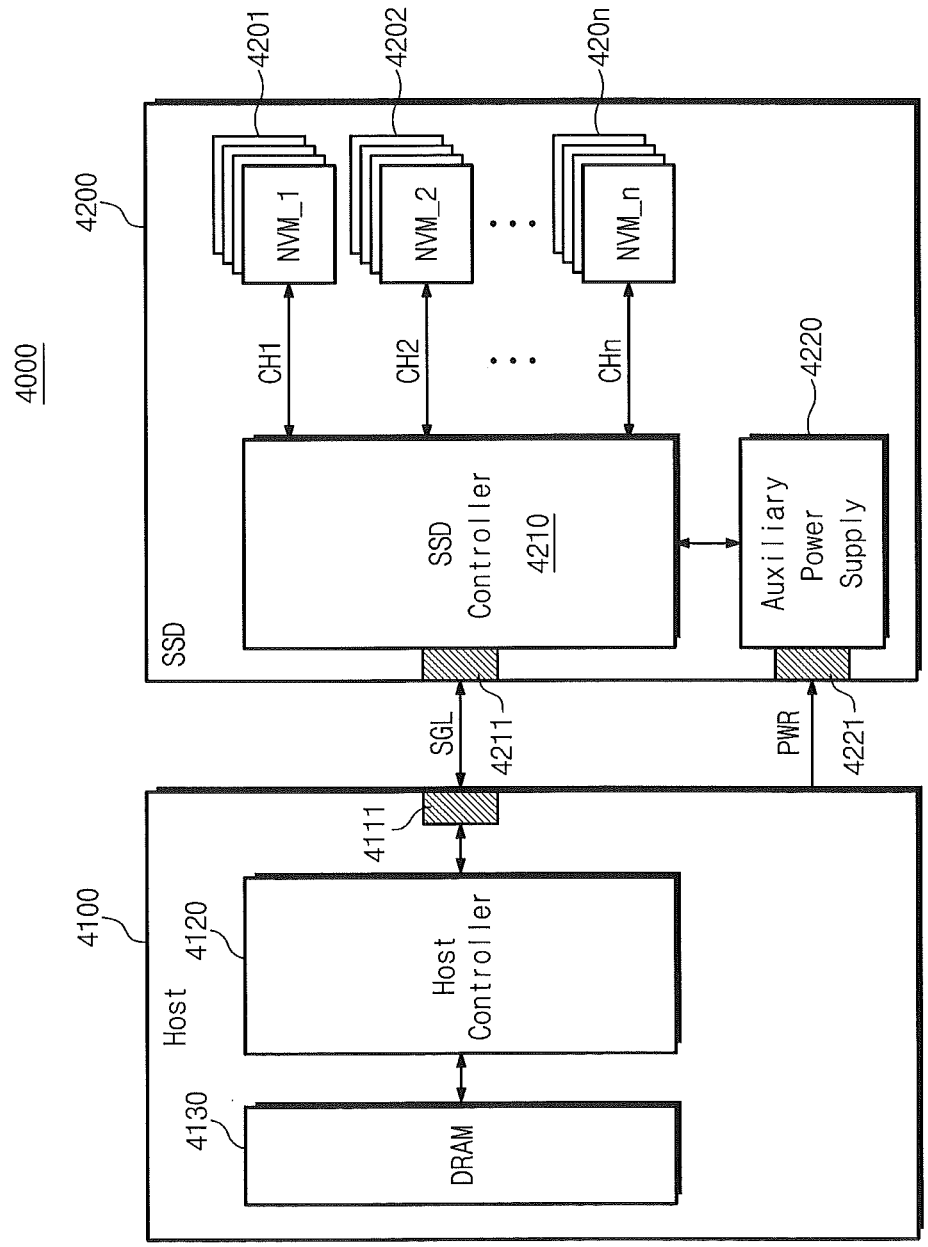
FIG. 10 is a block diagram illustrating a solid state drive system in which a user system according to the inventive concept is applied.

FIG. 10 is a block diagram illustrating a solid state drive system in which a user system according to the inventive concept is applied. Referring to FIG. 10, a solid state drive (SSD) system 4000 may include a host 4100 and an SSD 4200. The host 4100 may include a host interface 4111, a host controller 4120, and a DRAM 4130. The host 4100 may write data in the SSD 4200 or read data from the SSD 4200. The host controller 4120 may transfer signals SGL such as a command, an address, a control signal, and the like to the SSD 4200 via the host interface 4111. The DRAM 4130 may be a main memory of the host 4100. The SSD 4200 may exchange signals SGL with the host 4100 via the host interface 4211, and may be supplied with a power via a power connector 4221. The SSD 4200 may include a plurality of nonvolatile memories 4201 through 420n, an SSD controller 4210, and an auxiliary power supply 4220. Herein, the nonvolatile memories 4201 to 420n may be implemented by not only a flash memory but also PRAM, MRAM, ReRAM, and the like. The plurality of nonvolatile memories 4201 through 420n may be used as a storage medium of the SSD 4200. The plurality of nonvolatile memories 4201 to 420n may be connected with the SSD controller 4210 via a plurality of channels CH1 to CHn. One channel may be connected with one or more nonvolatile memories. Nonvolatile memories connected with one channel may be connected with the same data bus.

The SSD controller 4210 may exchange signals SGL with the host 4100 via the host interface 4211. Herein, the signals SGL may include a command, an address, data, and the like. The SSD controller 4210 may be configured to write or read out data to or from a corresponding nonvolatile memory according to a command of the host 4100. The SSD controller 4210 will be more fully described with reference to FIG. 11.

The auxiliary power supply 4220 may be connected with the host 4100 via the power connector 4221. The auxiliary power supply 4220 may be charged by a power PWR from the host 4100. The auxiliary power supply 4220 may be placed within the SSD 4200 or outside the SSD 4200. For example, the auxiliary power supply 4220 may be put on a main board to supply an auxiliary power to the SSD 4200.

Figure 11:
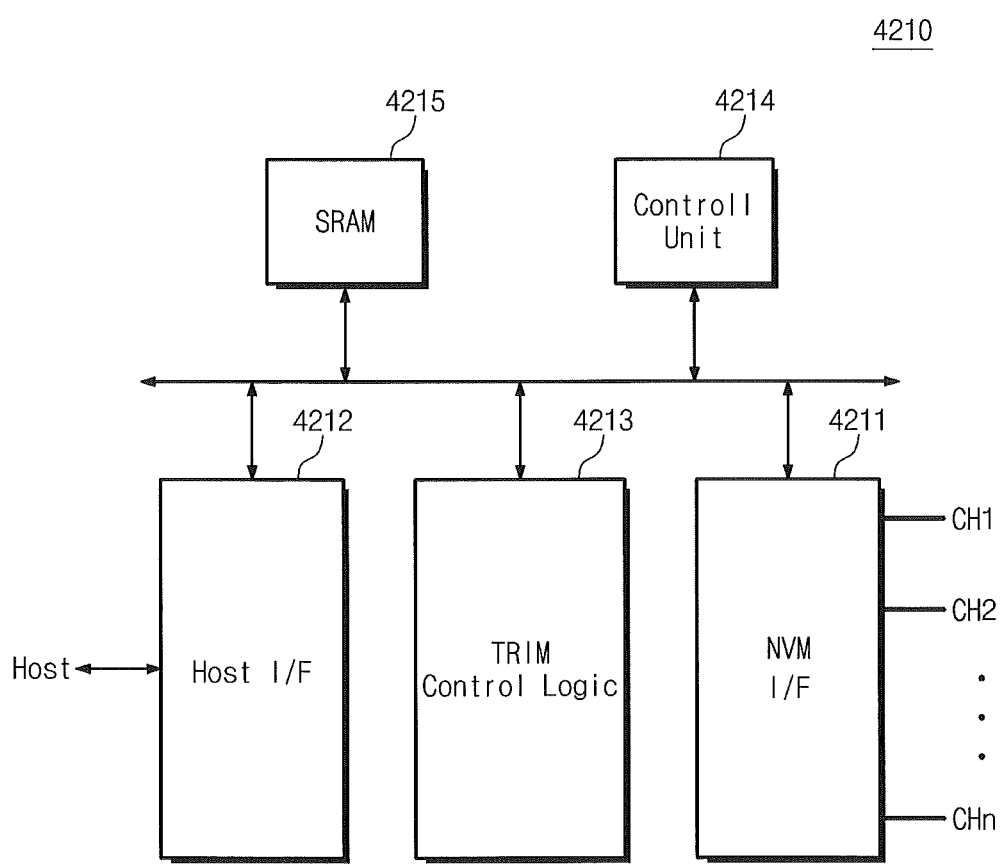
FIG. 11 is a block diagram schematically illustrating an SSD controller in FIG. 10.

FIG. 11 is a block diagram schematically illustrating an SSD controller in FIG. 10. Referring to FIG. 11, an SSD controller 4210 may include an NVM interface 4211, a host interface 4212, trim control logic 4213, a control unit 4214, and an SRAM 4215. The NVM interface 4211 may scatter data transferred from a main memory of a host 4100 to channels CH1 to CHn, respectively. The NVM interface 4211 may transfer data read from nonvolatile memories 4201 to 420n to the host 4100 via the host interface 4212. The host interface 4212 may provide an interface with an SSD 4200 according to the protocol of the host 4100. The host interface 4212 may communicate with the host 4100 using USB (Universal Serial Bus), SCSI (Small Computer System Interface), PCI express, ATA, PATA (Parallel ATA), SATA (Serial ATA), SAS (Serial Attached SCSI), etc. The host interface 4212 may perform a disk emulation function which enables the host 4100 to recognize the SSD 4200 as a hard disk drive (HDD). The trim control logic 4213 may manage a trim operation (a logging or invalidation operation) of the nonvolatile memories 4201 through 420n as described above. The trim control logic 4213 may include a trim sector bitmap, an LBA region table, and hardware or software for driving the trim region bitmap. The control unit 4214 may control the host 4100 via the host interface 4212 or the nonvolatile memories 4201 to 420n via the NVM interface 4211. The control unit 4214 may control the nonvolatile memories 4201 to 420n using firmware for driving the SSD 4200. The SRAM 4215 may be used to drive software which efficiently manages the nonvolatile memories 4201 to 420n. The SRAM 4215 may store metadata input from a main memory of the host 4100 or cache data. At a sudden power-off operation, metadata or cache data stored in the SRAM 4215 may be stored in the nonvolatile memories 4201 to 420n using an auxiliary power supply 4220.

Returning to FIG. 10, the SSD system 4000 according to an embodiment of the inventive concept may use a memory resource efficiently by classifying an LBA region into an LBA region not receiving trim information and an LBA region all receiving trim information using the trim control logic 4213. The inventive concept may be applied to the circumstance that all trim information is not logged since a memory resource (DRAM or SRAM) is not sufficient to log all trim information.

Figure 12:
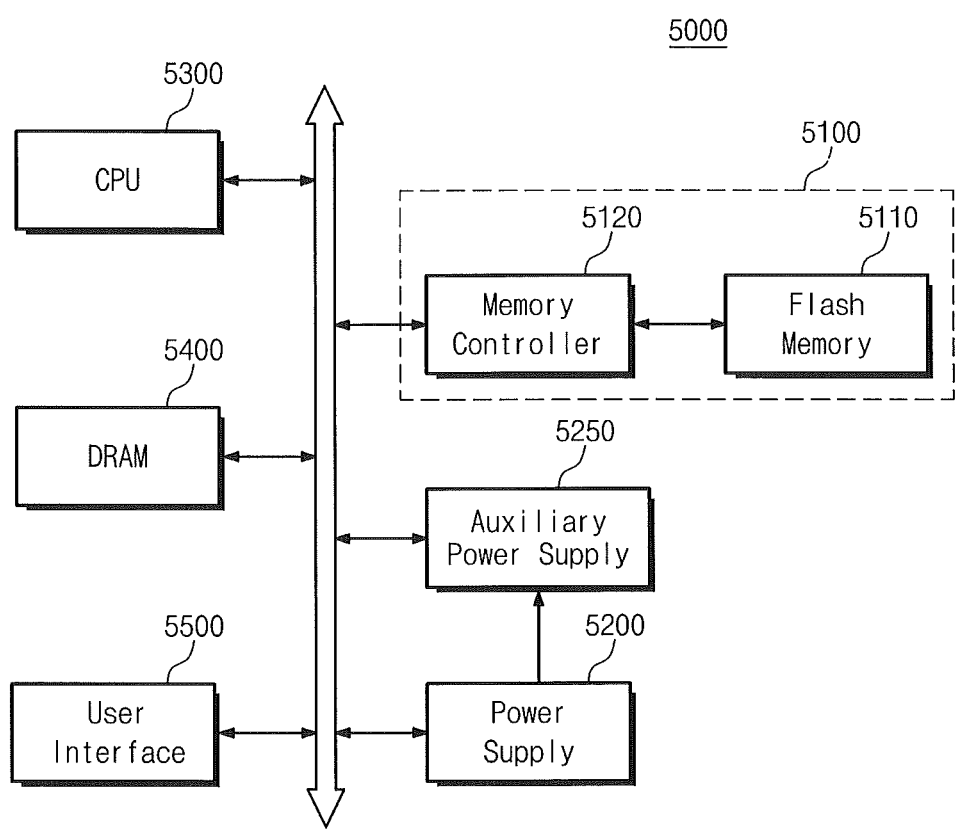
FIG. 12 is a block diagram schematically illustrating an electronic device including a memory system according to an embodiment of the inventive concept.

FIG. 12 is a block diagram schematically illustrating an electronic device including a memory system according to an embodiment of the inventive concept. Herein, an electronic device 5000 may be a personal computer or a handheld electronic device such as a notebook computer, a cellular phone, a PDA, a camera, and the like. The electronic device 5000 may include a user device 5100, a power supply device 5200, an auxiliary power supply 5250, a CPU 5300, a DRAM 5400, and a user interface 5500. The user device 5100 may be embedded within the electronic device 5000. A memory controller 5120 may include trim control logic (not shown). As described above, the electronic device 5000 according to an embodiment of the inventive concept may use a memory resource efficiently by classifying an LBA region into an LBA region not receiving trim information and an LBA region all receiving trim information using the trim control logic. The inventive concept may be applied to the circumstance that all trim information is not logged since a memory resource (DRAM or SRAM) is not sufficient to log all trim information. The user device 5100 according to an embodiment of the inventive concept can be applied to a flash memory having a two-dimensional structure as well as a flash memory having a three-dimensional structure.

Figure 13:
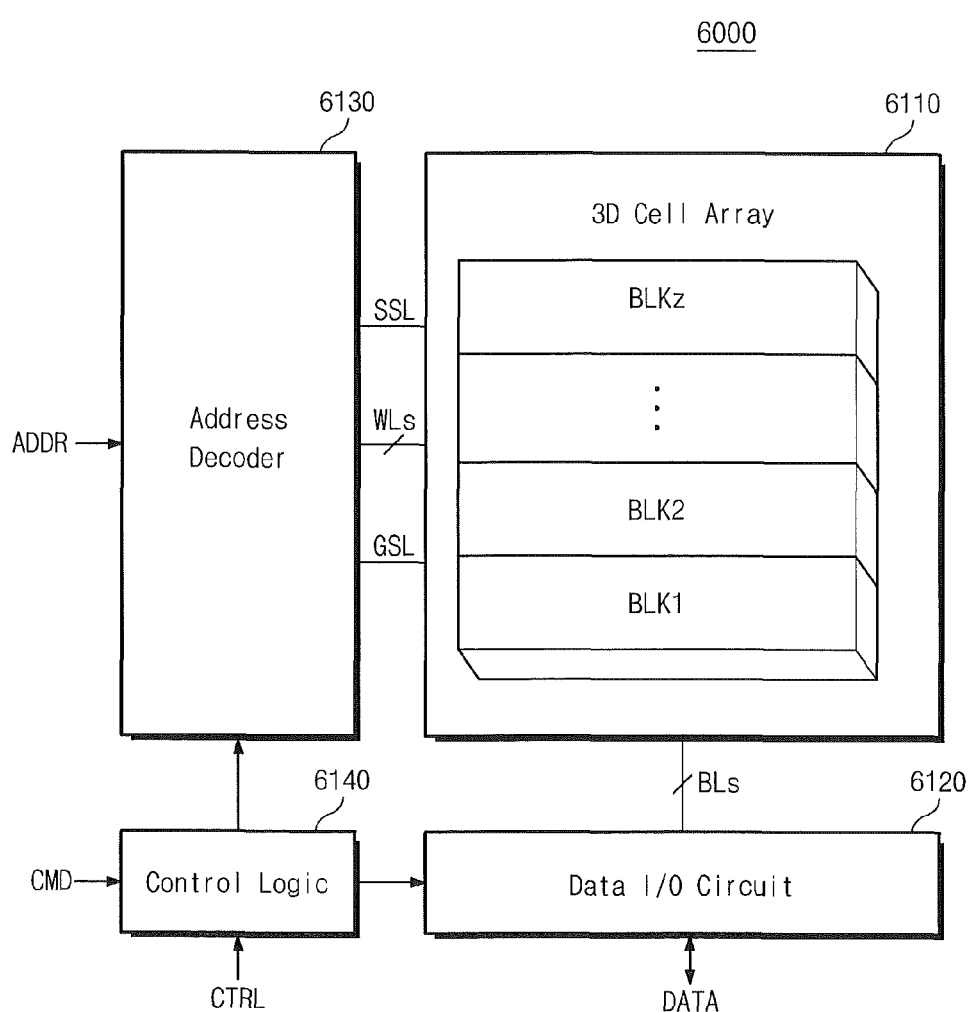
FIG. 13 is a block diagram schematically illustrating a flash memory applied to the inventive concept.

FIG. 13 is a block diagram schematically illustrating a flash memory applied to the inventive concept. Referring to FIG. 13, a flash memory 6000 may include a three-dimensional (3D) cell array 6110, a data input/output circuit 6120, an address decoder 6130, and control logic 6140.

The 3D cell array 6110 may include a plurality of memory blocks BLK1 through BLKz, each of which is formed to have a three-dimensional structure (or, a vertical structure). For a memory block having a two-dimensional (horizontal) structure, memory cells may be formed in a direction horizontal to a substrate. For a memory block having a three-dimensional structure, memory cells may be formed in a direction perpendicular to the substrate. Each memory block may be an erase unit of the flash memory 6000. The data input/output circuit 6120 may be connected with the 3D cell array 6110 via a plurality of bit lines. The data input/output circuit 6120 may receive data from an external device or may output data read from the 3D cell array 6110 to the external device. The address decoder 6130 may be connected with the 3D cell array 6110 via a plurality of word lines and selection lines GSL and SSL. The address decoder 6130 may select the word lines in response to an address ADDR. The control logic 6140 may control programming, erasing, reading, and the like of the flash memory 6000. For example, at programming, the control logic 6140 may control the address decoder 6130 such that a program voltage is supplied to a selected word line, and may control the data input/output circuit 6120 such that data is programmed.

Figure 14:
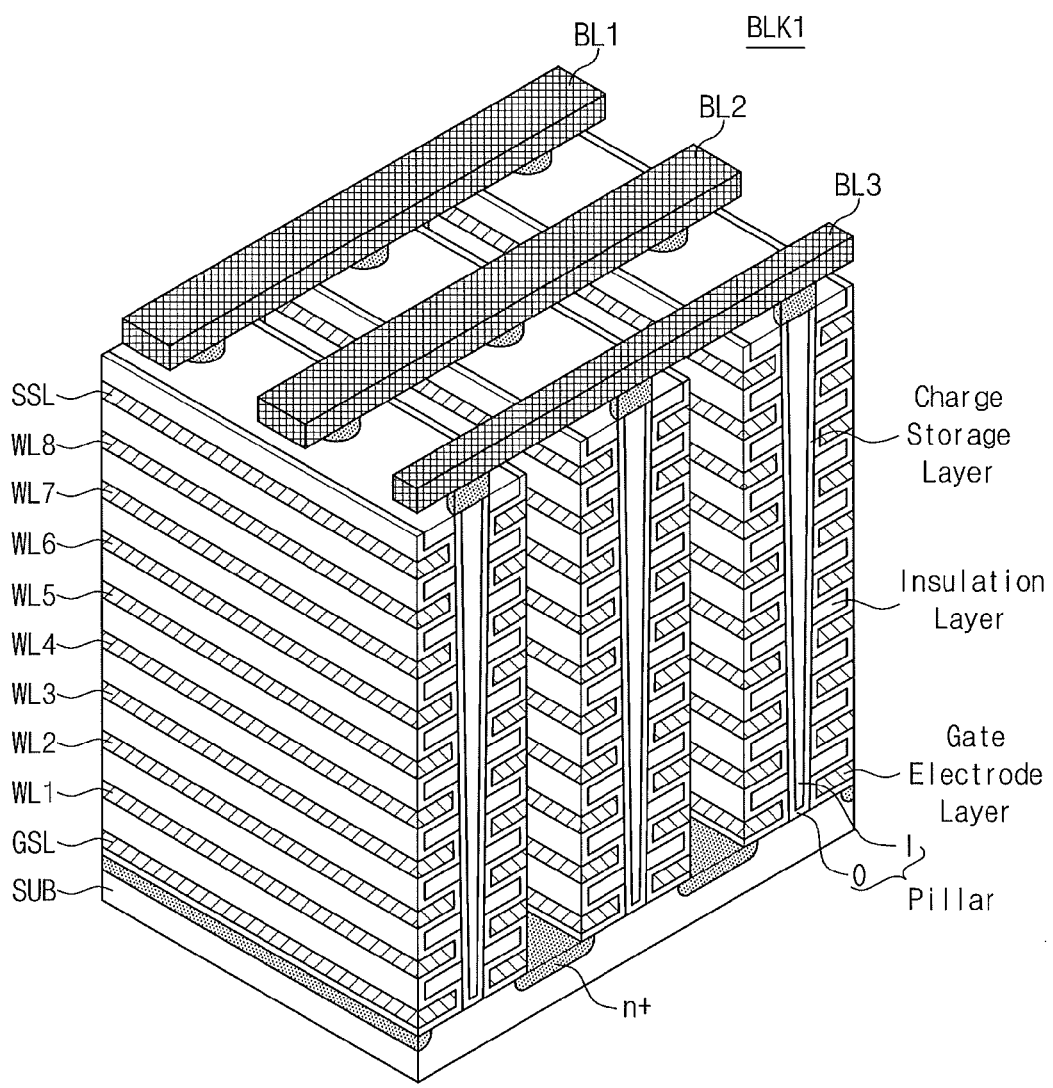
FIG. 14 is a perspective view schematically illustrating a 3D structure of a memory block illustrated in FIG. 13.

FIG. 14 is a perspective view schematically illustrating a 3D structure of a memory block illustrated in FIG. 13. Referring to FIG. 14, a memory block BLK1 may be formed in a direction perpendicular to a substrate SUB. An n+ doping region may be formed at the substrate SUB. A gate electrode layer and an insulation layer may be deposited on the substrate SUB in turn. A charge storage layer may be formed between the gate electrode layer and the insulation layer. If the gate electrode layer and the insulation layer are patterned in a vertical direction, a V-shaped pillar may be formed. The pillar may penetrate the gate electrode and insulation layers so as to be connected with the substrate SUB. An outer portion O of the pillar may be formed of a channel semiconductor, and an inner portion thereof may be formed of an insulation material such as silicon oxide. The gate electrode layer of the memory block BLK1 may be connected with a ground selection line GSL, a plurality of word lines WL1 through WL8, and a string selection line SSL. The pillar of the memory block BLK1 may be connected with a plurality of bit lines BL1 through BL3. In FIG. 14, there is exemplarily illustrated the case that one memory block BLK1 has two selection lines SSL and GSL and eight word lines WL1 to WL8. However, the inventive concept is not limited thereto.

Figure 15:
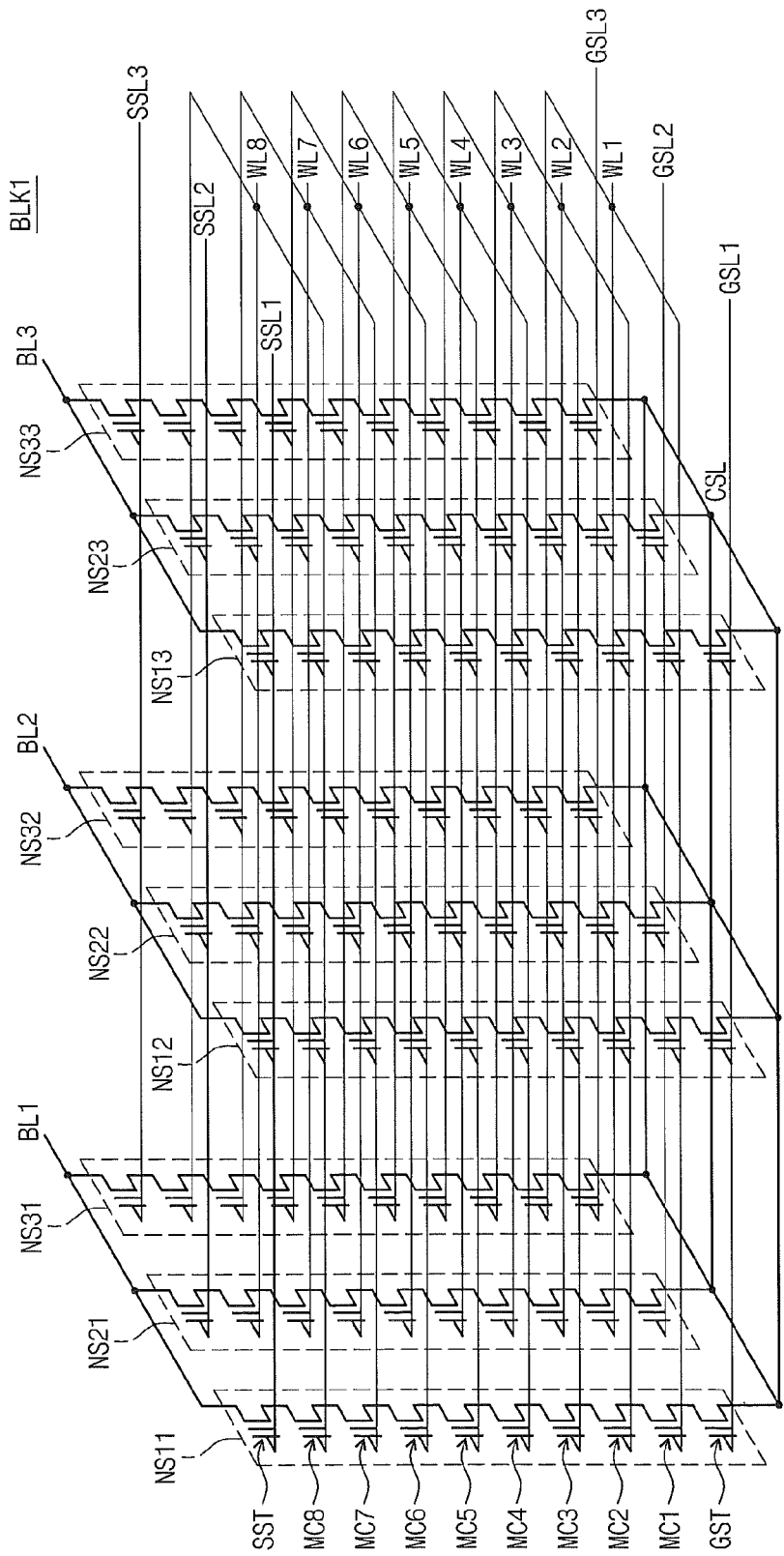
FIG. 15 is a diagram schematically illustrating an equivalent circuit of a memory block illustrated in FIG. 14.

FIG. 15 is a diagram schematically illustrating an equivalent circuit of a memory block illustrated in FIG. 14. Referring to FIG. 15, NAND strings NS11 through NS33 may be connected between bit lines BL1 through BL3 and a common source line CSL. Each NAND string (e.g., NS11) may include a string selection transistor SST, a plurality of memory cells MC1 through MC8, and a ground selection transistor GST. The string selection transistors SST may be connected with string selection lines SSL1 through SSL3. The memory cells MC1 through MC8 may be connected with corresponding word lines WL1 through WL8, respectively. The ground selection transistors GST may be connected with ground selection lines GSL1 through GSL3. A string selection transistor SST may be connected with a bit line, and a ground selection transistor GST may be connected with a common source line CSL. Word lines (e.g., WL1) having the same height may be connected in common, and the ground selection lines GSL1 through GSL3 and the string selection lines SSL1 through SSL3 may be separated from one another. At programming of memory cells (constituting a page) connected with a first word line WL1 and included in NAND strings NS11, NS12, and NS13, a first word line WL1, a first string selection line SSL1, and a first ground selection line GSL1 may be selected.

Figure 16:
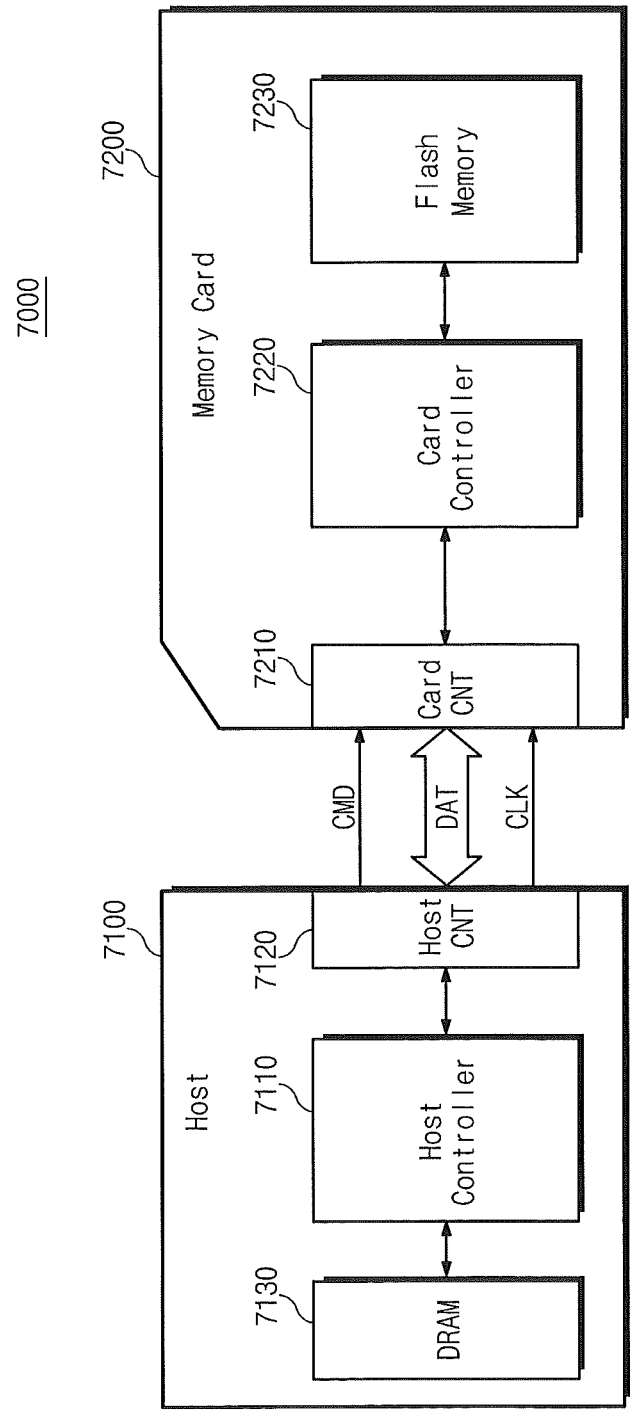
FIG. 16 is a block diagram illustrating a memory card system to which a user system according to an embodiment of the inventive concept is applied.

FIG. 16 is a block diagram illustrating a memory card system to which a user system according to an embodiment of the inventive concept is applied. A memory card system 7000 may include a host 7100 and a memory card 7200. The host 7100 may include a host controller 7110, a host connection unit 7120, and a DRAM 7130. The host 7100 may write data in the memory card 7200 and read data from the memory card 7200. The host controller 7110 may send a command (e.g., a write command), a clock signal CLK generated from a clock generator (not shown) in the host 7100, and data to the memory card 7200 via the host connection unit 7120. The DRAM 7130 may be a main memory of the host 7100. The memory card 7200 may include a card connection unit 7210, a card controller 7220, and a flash memory 7230. The card controller 7220 may store data in the flash memory 7230 in response to a command input via the card connection unit 7210. The data may be stored in synchronization with a clock signal generated from a clock generator (not shown) in the card controller 7220. The flash memory 7230 may store data transferred from the host 7100. For example, in a case where the host 7100 is a digital camera, the flash memory 7230 may store image data. The memory card system 7000 illustrated in FIG. 16 may include trim control logic (not shown) that is included within the host controller 7110, the card controller 7220, or the flash memory 7230. As described above, the inventive concept may use a memory resource efficiently by classifying an LBA region into an LBA region not receiving trim information and an LBA region all receiving trim information using the trim control logic. The inventive concept may be applied to the circumstance that all trim information is not logged since a memory resource (DRAM or SRAM) is not sufficient to log all trim information.

Although not shown in FIG. 16, a user device according to an embodiment of the inventive concept may further include an application chipset, a camera image processor (CIS), a mobile DRAM, and the like.

A storage device according to an embodiment of the inventive concept may be packed by various packages. For example, a flash memory and/or a controller may be packed by packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A storage device comprising:
   a flash memory storing data; and
   a controller controlling the flash memory and performing an invalidation operation or a logging operation in response to a trim command of a host,
   wherein if a capacity of a region to be deleted exceeds a reference capacity, the controller is configured to operate the logging operation, configures a trim sector bitmap using trim information provided from the host and manages the trim sector bitmap by a region unit,
   wherein if the capacity of the region to be deleted does not exceed the reference capacity, the controller is configured to operate the invalidation operation.

2. The storage device of claim 1, wherein the controller includes an LBA region table for managing the trim sector bitmap by an LBA region unit having a predetermined size.

3. The storage device of claim 2, wherein the trim sector bitmap and the LBA region table are driven on a local memory.

4. The storage device of claim 3, wherein the LBA region table stores information on a region not receiving the trim information and a region all receiving the trim information.

5. The storage device of claim 4, wherein the LBA region table stores an address of the local memory, at which the trim information is being stored, and the number of data bits of the trim sector bitmap at which the trim information is stored.

6. The storage device of claim 4, wherein the controller does not assign the local memory for the trim sector bitmap separately, based on the LBA region table at an invalidation operation.

7. The storage device of claim 6, wherein the controller does not assign the local memory for the trim sector bitmap in case of a region not receiving the trim information or a region all receiving the trim information.

8. A user device comprising:
   a host providing a trim command; and
   a storage device performing an invalidation operation or a logging operation according to the trim command,
   wherein if a capacity of a region to be deleted exceeds a reference capacity, the storage device is configured to operate the logging operation, configures a trim sector bitmap using trim information provided from the host and manage the trim sector bitmap by a region unit,
   wherein if the capacity of the region to be deleted does not exceed the reference capacity, the controller is configured to operate the invalidation operation.

9. The user device of claim 8, wherein the storage device comprises:
   a flash memory storing data; and
   a controller controlling the flash memory and dividing the trim sector bitmap by a region unit to perform a logging operation.

10. The user device of claim 9, wherein the controller includes an LBA region table for managing the trim sector bitmap by an LBA region unit having a predetermined size.

11. The user device of claim 10, wherein the controller includes a local memory, the trim sector bitmap and the LBA region table are driven on a local memory, and the LBA region table stores information on a region not receiving the trim information and a region all receiving the trim information.

12. The user device of claim 11, wherein the controller does not assign the local memory for the trim sector bitmap in case of a region not receiving the trim information or a region all receiving the trim information.

13. The user device of claim 11, wherein the controller further comprises a memory for driving a trim region bitmap that stores information on the LBA region table, and an operating speed of the memory is higher than that of the local memory.

14. The user device of claim 8, wherein the storage device is a solid state drive.

15. The user device of claim 8, wherein the storage device is a memory card.

16. An integrated circuit device, comprising:
   a flash memory; and
   a controller electrically coupled to said flash memory, said controller configured to perform a logging operation in response to a trim command by updating a trim sector bitmap within a local memory on a logical block address (LBA) region-by-region basis when a capacity of a region to be deleted exceeds a reference capacity and perform an invalidation operation to invalidate data in said flash memory when the capacity of the region to be deleted does not exceed the reference capacity, said local memory including a LBA region table having a plurality of entries therein including at least a first region associated with a first memory allocation within the trim sector bitmap and a second region associated with no memory allocation within the trim sector bitmap.

17. The device of claim 16, wherein said logging operation records a location in said flash memory to be deleted, in response to the trim command.

18. The device of claim 17, wherein said controller is further configured to erase data in the recorded location in said flash memory during an idle time interval.

\* \* \* \* \*